(12) United States Patent
Ou et al.

(10) Patent No.: US 8,987,352 B1
(45) Date of Patent: Mar. 24, 2015

(54) PHASE SEPARATED SELF-HEALING POLYMER COATINGS

(75) Inventors: Runqing Ou, Bridgewater, NJ (US); Kenneth Eberts, Westfield, NJ (US); Ganesh Skandan, Easton, PA (US)

(73) Assignee: NEI Corporation, Somerset, NJ (US)

( * ) Notice: Subject to any disclaimer, the term of this patent is extended or adjusted under 35 U.S.C. 154(b) by 89 days.

(21) Appl. No.: 12/977,164

(22) Filed: Dec. 23, 2010

Related U.S. Application Data

(60) Provisional application No. 61/289,742, filed on Dec. 23, 2009.

(51) Int. Cl.
*C08L 67/04* (2006.01)
*C08L 75/04* (2006.01)
*C08L 75/08* (2006.01)
*C09D 175/04* (2006.01)

(52) U.S. Cl.
CPC ........... *C09D 175/04* (2013.01); *Y10S 524/903* (2013.01)
USPC ........... 523/215; 524/415; 524/455; 524/903; 521/134; 521/88; 521/154

(58) Field of Classification Search
USPC ...................... 521/54, 88, 134, 154
See application file for complete search history.

(56) References Cited

U.S. PATENT DOCUMENTS

| | | | | |
|---|---|---|---|---|
| 3,563,939 A | * | 2/1971 | Stevens, Jr. et al. | 523/457 |
| 3,615,972 A | * | 10/1971 | Morehouse et al. | 156/79 |
| 4,035,439 A | * | 7/1977 | Stevenson | 525/28 |
| 4,552,906 A | * | 11/1985 | Podszun et al. | 523/115 |
| 4,859,742 A | * | 8/1989 | Pattein et al. | 525/131 |
| 4,912,174 A | * | 3/1990 | Grouiller | 525/415 |
| 4,954,195 A | * | 9/1990 | Turpin | 156/242 |
| 5,066,231 A | * | 11/1991 | Oxman et al. | 433/214 |
| 5,403,188 A | * | 4/1995 | Oxman et al. | 433/218 |
| 5,584,800 A | * | 12/1996 | Scholz et al. | 602/6 |
| 5,591,786 A | * | 1/1997 | Oxman et al. | 523/109 |
| 5,635,545 A | * | 6/1997 | Oxman et al. | 523/115 |
| 5,709,548 A | * | 1/1998 | Oxman et al. | 433/218 |
| 5,753,781 A | * | 5/1998 | Oxman et al. | 525/415 |
| 5,763,075 A | * | 6/1998 | Benjamin et al. | 428/349 |
| 5,834,537 A | * | 11/1998 | Gotro et al. | 523/440 |
| 5,997,682 A | * | 12/1999 | Goodman et al. | 156/273.7 |
| 6,225,373 B1 | * | 5/2001 | Gotro et al. | 523/206 |
| 6,506,816 B1 | * | 1/2003 | Ario et al. | 523/116 |
| 6,518,330 B2 | * | 2/2003 | Moore et al. | 523/200 |
| 6,521,258 B1 | * | 2/2003 | Mandel et al. | 424/484 |
| 6,794,472 B2 | * | 9/2004 | Harris et al. | 526/262 |
| 6,939,900 B2 | * | 9/2005 | Ario et al. | 523/116 |
| 7,204,875 B2 | * | 4/2007 | Jia et al. | 106/35 |
| 7,211,136 B2 | * | 5/2007 | Jia et al. | 106/35 |
| 7,230,047 B2 | * | 6/2007 | Issari | 524/500 |
| 7,235,605 B2 | * | 6/2007 | Nakagawa et al. | 525/166 |
| 7,303,817 B2 | * | 12/2007 | Jia | 428/375 |
| 7,612,152 B2 | * | 11/2009 | Braun et al. | 525/476 |
| 7,723,405 B2 | * | 5/2010 | Braun et al. | 523/212 |
| 2001/0016609 A1 | * | 8/2001 | Meguriya et al. | 521/54 |
| 2002/0106605 A1 | * | 8/2002 | Seghatol | 433/29 |
| 2004/0006200 A1 | * | 1/2004 | Nakagawa et al. | 528/481 |
| 2004/0007784 A1 | * | 1/2004 | Skipor et al. | 257/788 |
| 2006/0111469 A1 | * | 5/2006 | White et al. | 523/200 |
| 2006/0252852 A1 | * | 11/2006 | Braun et al. | 523/200 |
| 2008/0299391 A1 | * | 12/2008 | White et al. | 428/402.21 |
| 2009/0015272 A1 | * | 1/2009 | Jones et al. | 324/693 |
| 2009/0314406 A1 | * | 12/2009 | Browne et al. | 152/503 |
| 2011/0003159 A1 | * | 1/2011 | Mather et al. | 428/425.6 |

OTHER PUBLICATIONS

Thermally Expandable Microspheres Prepared via Suspension Polymerization—Synthesis, Characterization, and Application, Magnus Jonsson, 2006, Elsevier Ltd.*
Preparation of Robust Poly(caprolactone) Hollow Spheres with Controlled Biodegragability, Macromol. Rapid Commun. 2006, 27, 1265-1270.*

* cited by examiner

*Primary Examiner* — James J Seidleck
*Assistant Examiner* — Peter A Salamon
(74) *Attorney, Agent, or Firm* — William L. Botjer

(57) ABSTRACT

Phase separated self-healing polymer coatings having a "biphasic" thermoset/thermoplastic morphology to achieve self-healing. The biphasic structure has: (i) a major "load-bearing" thermoset phase that has superior strength and performs major mechanical and structural functions, and (ii) a "self-healing" phase of a thermoplastic healing agent to repair the material and restore its mechanical and structural integrity after being damaged. The phase-separated morphology is achieved through phase separation via a reaction process.

12 Claims, 6 Drawing Sheets

Before healing    After healing

Before healing    After healing

Before healing  After healing

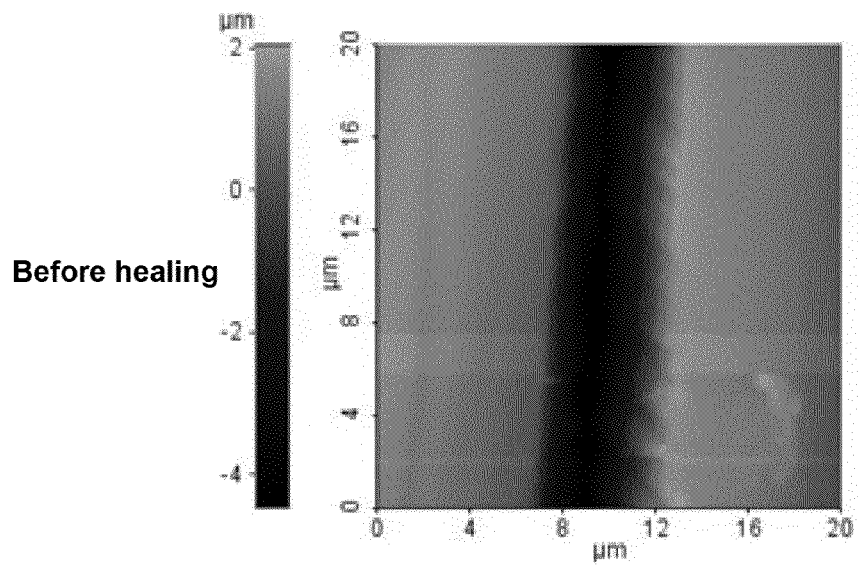
Before healing
Fig. 8
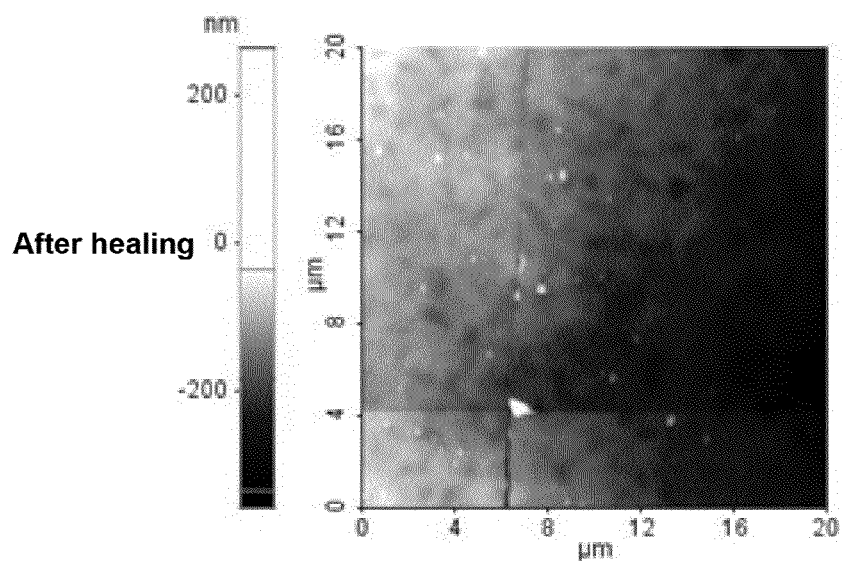
After healing

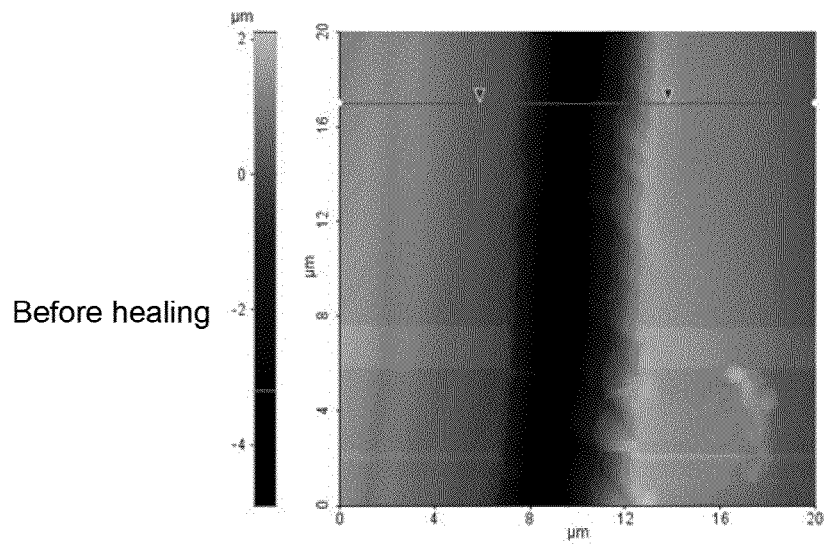
Before healing
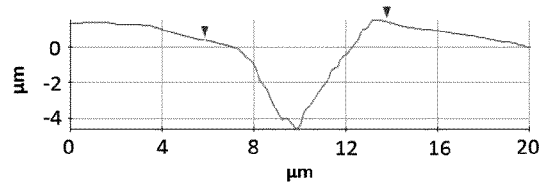
Fig. 9
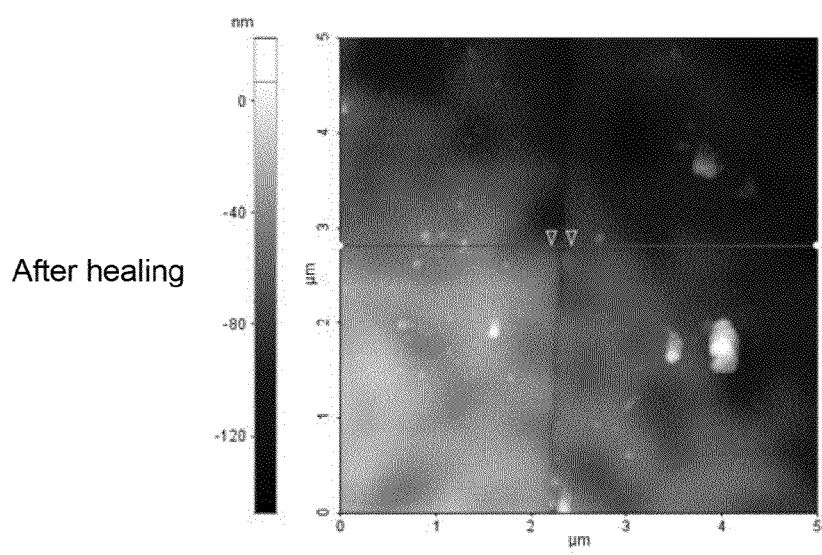
After healing
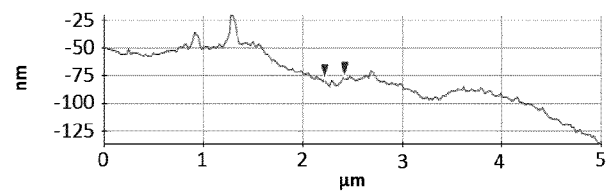

PHASE SEPARATED SELF-HEALING POLYMER COATINGS

This application claims the priority of U.S. provisional patent application, Ser. No. 61/289,742, filed Dec. 23, 2009, titled, 'SELF-HEALING POLYMER COATINGS', the contents of which are herein incorporated by reference.

STATEMENT OF GOVERNMENT SUPPORT OF INVENTION

The work leading to the present application was done as part of a DoE SBIR Phase I contract no. DE-FG02-08ER85101 and Phase II contract no. DE-FG02-08ER85101. The Government has certain rights in the invention.

BACKGROUND OF THE INVENTION

A polymer coating imparts two important functions to the underlying substrate: the aesthetic function gives the substrate a good appearance while the protective function protects the substrate from mechanical and chemical damage. Due to routine wear and tear, surface scratches are generated and micro-cracks develop and eventually lead to macroscopic damage, which results in the coating losing its aesthetic and protective functions. Corrosion protection coatings are especially intolerant to crack formation because it will expose the underlying metal to a corrosive environment, thereby shortening the service life of the coating. The use of a self-healing coating will increase the operational life of coatings and eliminate the need to frequently repaint or replace damaged coatings. In addition to a huge cost saving, this results in significant savings in energy used in fabricating the coating materials and applying the coatings.

When a polymer coating is mechanically damaged, it is either plastically deformed at the surface (such as a blunt indent or a light scratch), or cracked (such as a cut made with a sharp blade). The majority of existing self-healing technologies do not target both forms of damage. One is neglected at the expense of the other. An example is the polyurethane based self-healing coating developed by Bayer Material Science for the automotive industry [Benthem, R.; Ming, W.; With, G., Self Healing Polymer Coatings. In *Self Healing Materials,* 2007; pp 139-159;]. The coating utilized the shape memory effect (termed as "reflow effect") to recover plastic deformation, for example the scratch from a car wash. There is no "self-healing" in the case of cracking or micro-cracking due to the lack of chemical or physical forces to "re-bond" the newly generated crack surfaces.

Cho et al. [Cho, S. H.; White, S. R.; Braun, P. V., Self-Healing Polymer Coatings. *Advanced Materials* 2009, 21, (6), 645-649.] developed a coating containing encapsulated healing agents and catalysts that specifically tackles crack healing/re-bonding, based on their previous success with bulk self-healing polymers using the same strategy [White, S. R.; Sottos, N. R.; Geubelle, P. H.; Moore, J. S.; Kessler, M. R.; Sriram, S. R.; Brown, E. N.; Viswanathan, S., Autonomic healing of polymer composites. *Nature* 2001, 409, (6822), 794-797.]. A surface crack made by hand scribing with a sharp razor blade ruptures the capsules and triggers the crosslinking of the released healing agent to seal the crack. This strategy is only applicable to healing cracks, since the formation of a crack is necessary to rupture the capsules where no capsules are likely to be ruptured (therefore no healing agent released) during plastic deformation. A similar methodology uses hollow fibers [Dry, C., Comp. Struc., 1996, 35, 263-269.] or interconnected microchannels [Toohey, K. S.; White, S. R.; Sottos, N. R., Self-healing polymer coatings. Proc. 2005 SEM annual conference] to store the healing materials. Fabrication of a microvascular network is a challenge, which limits its application.

Besides polymerization based healing, reversible chemistry based on Diels-Alder reaction, hydrogen bonded supramolecular network, and ionic liquids have been utilized for producing healable polymer materials. All these are limited to a narrow set of less commonly used polymers, rendering widespread utilization of the technology unlikely. A unique approach among these methods is a thermoset/thermoplastic mixture that offers crack sealing capacity when the material is heated, and the thermoplastic is able to diffuse across the crack boundary [Jones, F and Hayes, S. A., "Self Healing Composite Material", WO 2005/066244 A2.]. However, the only driving force for crack sealing is chain diffusion, and crack closing is not part of the method. Most recently, researchers from University of Southern Mississippi invented a polyurethane based self-healing material by mixing chitosan into the compound. Upon exposure to UV light, chitosan rods are broken up and bond to each other across the damaged area. A drawback of this technology is that repeated healing is not possible.

SUMMARY OF THE INVENTION

The present invention overcomes the challenges of previous self-healing coating technology by utilizing a biphasic thermoset/thermoplastic morphology. The technology not only heals plastic deformations caused by fine scratches but also deep cracks as well. Other advantages include multiple healings, maintaining high gloss, commercial viability due to the use of inexpensive materials. Nanoparticles can be added to improve the mechanical properties of the coating. Although the technology was developed with a polyurethane coating system, the same principles can be applied to other coating material systems as well. A polyurethane coating is used as an example throughout the specifications.

The present invention is directed to the use of a unique biphasic thermoset/thermoplastic morphology to achieve self-healing. The "biphasic" structure consists of: (i) a major "load-bearing" thermoset phase that has superior strength and performs major mechanical and structural functions, and (ii) a "self-healing" phase of a thermoplastic flowable healing agent to repair the material and restore its mechanical and structural integrity after being damaged. The phase-separated morphology can be achieved through a "phase separation via reaction process". This unique morphology encompasses both the strength of a thermoset and the healing ability of a thermoplastic.

A thermoplastic material becomes liquid like above its glass transition or meting temperature (for semicrystalline thermal plastic polymer). This property can be utilized for self-healing purposes. However, a thermoplastic material loses its strength and integrity above its glass transition temperature. This is a contradiction. The coating cannot simultaneously possess the property of free flowing in order to self-heal and the property of withstanding flow in order to feel hard. The dilemma is resolved in the present invention by a biphasic thermoset/thermal plastic morphology. Adding a thermoplastic to a thermoset has been done previously. A thermoset/thermoplastic mixture has been shown to offer crack sealing capacity when the material is heated, and the thermoplastic is able to diffuse across the crack boundary [Jones, F and Hayes, S. A., "Self Healing Composite Material", WO 2005/066244 A2.]. However, in this system, the thermoset and thermoplastic are miscible, e.g., they form a single phase. When two polymers having different glass transition temperatures ($T_g$) are blended into a single phase material, a single glass transition temperature exists, which takes a value in between the glass transition temperatures of the two composing polymers. This means that adding a miscible thermal plastic to the thermoset lowers its glass transition temperature, and hence the mechanical performance such as hardness.

A phase separated thermoset/thermoplastic coating, on the other hand, displays two glass transition temperatures: a high glass transition temperature corresponding to the thermoset phase and a low glass transition temperature corresponding to the thermoplastic phase. This allows both phases to perform their functions. The high $T_g$ phase will provided the strength and stability while the low $T_g$ phase will have enough mobility to heal the microcracks when needed. A miscible single phase blend, on the other hand, will have compromised mechanical properties and limited mobility.

The present invention is directed to the use of phase separation via reaction to achieve a biphasic morphology. This method has several advantages compared to mechanical mixing. First, it results in a homogeneous dispersion of the second phase by an in-situ process, thus eliminating the surface functionalization of thermoplastic particles. Second, the morphology and domain size of the second phase can be controlled by varying the different processing parameters: type of curing agent, curing temperature and molecular weight of the thermoplastic. The polymer chemistry can be easily scaled-up on a large scale to produce commercially viable products.

Phase separation via reaction is often used to generate a thermal plastic phase in a brittle thermoset bulk material such as epoxy to toughen the thermoset. Phase separation via reaction is generally not used in a coating for several reasons. First, toughness is usually not as important in a coating as it is in a bulk material. It is the hardness that is usually a top priority. Because of the hardness concern thermoplastic material is not usually added to a coating formulation. In cases where thermoplastic is needed, it is chosen such that it is miscible with the thermoset. This ensures the transparency of the coating which is important because the aesthetic function of a coating is as important as its protective function. Adding a phase separated thermoplastic to the coating is counterintuitive to meeting the requirements of a coating. The present invention resolves the difficulty by controlling the scale of the phase separated morphology to maintain gloss and by adding nanoparticles and to improve hardness. When the scale of the phase separated feature is smaller than the wavelength of visible light, scattering of light can be greatly reduced. Likewise, when nanoparticles are well dispersed in the matrix, coating transparency will not be affected.

We have demonstrated a phase-separated morphology and self healing properties in a polyurethane based coating system. A polyurethane coating was chosen because of its popularity and excellent properties, polycaprolactone (PCL) was the thermoplastic polymer used. The approach is generic and can be implemented with other incompatible thermoset/thermoplastic blends as well, provided the biphasic morphology be adjusted by the composition and synthesis conditions such as the curing temperature and pressure, etc. Thermoset materials that may be used for coatings in accordance with this invention include: polyurethane, epoxy, bis-maleimide, phenol-formaldehyde, urea-formaldehyde, melamine-formaldehyde, polyimide, alkyd, unsaturated polyester, silicone, fluoropolymers, and polyvinyl formal and blends thereof. Thermoplastic materials that may be used as healing material in the coatings include: polyester, e.g. polycarplactone, poly (acrylic acid), poly(acrylonitrile), poly(ether ketone), polystyrene, thermoplastic polyurethane, poly(vinyl acetate) and blends thereof.

To compensate for the softness of the PCL phase, we incorporated nanoparticles to reinforce the PCL phase. The nanoparticles can be, but are not limited to the following: an organo-modified clay, metal oxide, organo-modified metal oxide, and carbon nanotubes. A special nanoparticle that can be useful is a PCL grafted alumina, which is naturally compatible with the PCL phase. In addition, the PCL chains grafted on the nanoparticles can take an active part in the self healing process.

BRIEF DESCRIPTION OF THE DRAWINGS

Various embodiments of the invention will hereinafter be described in conjunction with the appended drawings, provided. To illustrate and not to limit the invention, wherein like designations denote like elements, and in which:

FIG. 8 are atomic force microscopy (AFM) images of PU/PCL nanocomposite coating before and after healing.

FIG. 9 is an AFM line profile analysis of razor blade crack on PU/PCL nanocomposite coating before and after healing.

DESCRIPTION OF THE PREFERRED EMBODIMENTS

Figure 1:
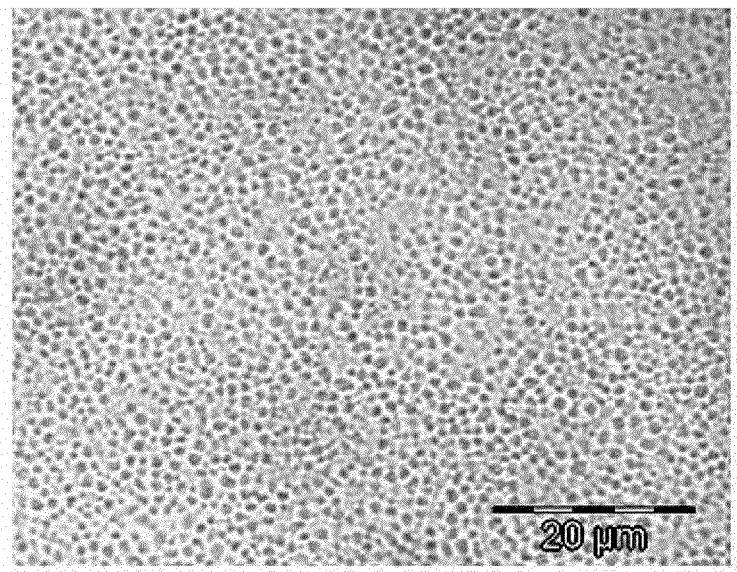
FIG. 1 is a transmission optical microscope image of the polyurethane/polycaprolactone (PU/PCL) composites (20% PCL).

The self healing polymer coating that we have developed is a polyurethane based coating with a thermoplastic healing material (PCL) incorporated into the coating. Through a unique phase separation via reaction process, the thermoplastic PCL and the thermoset polyurethane form a phase separated morphology with the phase separated features controlled so as to be well under 1 micron in size. A typical grade PCL has a molecular weight (number average) between 10,000 and 90,000. Depending upon the molecular weight, the phase separated morphology can be different. The PCL used in the examples had a molecular weight (number average) of 42,000. Phase separated morphology and self healing properties have been demonstrated in solvent borne thermally cured coating. The thermoplastic PCL content in these coatings is between 10 wt % and 30 wt %, more preferably between 10 wt % and 20 wt %. Initially, PCL is dissolved in a solvent. This will be combined with the polyol component of the polyurethane. A single phase solution will result. After polyisocyanate is added and the coating mixture is heated, a reaction between the OH groups of the polyol and isocyanate groups on the polyisocyanate will start the polymerization reaction, leading to the formation of a high molecular weight polyurethane network. Meanwhile, as polymerization progresses, PCL and polyurethane start to phase separate and phase separation will continue until the phase separated structure is immobilized by gelation and vitrification during curing when the viscosity of the system reaches such a point that phase separation stops.

Example 1

Production of Polyurethane Coating Formulation Containing 20% PCL and Coating of Test Panels In a 4 oz wide mouth jar, 2.73 g of PCL (Aldrich, typical $M_n$ 42,500, typical $M_w$ 65,000) was combined with 2.7 g of THF and 10.1 g of butyl acetate. The polymer was allowed to dissolve with the aid of an ultrasonic bath. 9.15 g of the Desmophen R 221 75 saturated polyester (Bayer Material Science) was then added to the PCL solution and mixed with a magnetic stir bar to obtain a transparent solution. Finally, 5.0 g of Desmodur N 3390 BA/SN aliphatic polyisocyanate (Bayer Material Science) and 0.33 g of a 10% Byk-301 surfactant solution in butyl acetate were added to the solution. The solution was mechanically stirred for 2 minutes first, and then transferred to a covered plastic mixing cup for further mixing and degassing using a Thinky centrifugal mixer. The mixing and degassing schedule was mixing at 2000 rpm for 1 minute (2000 rpm) degassing at 2200 rpm for 30 seconds. The mixture was transparent before application and heat activation. After the coating formulation was applied to a substrate and heated up to 70° C. degrees, the phase separation via reaction process started as PCL and polyurethane phase separated into a polyurethane rich phase and a PCL rich phase. Phase separation continued until gelation and vitrification when the phase separated features were captured. The temperature at which reaction occurred was important. We conducted reactions at different temperatures: 25° C., 55° C., 70° C., and 120° C. We found that at 25° C., and 55° C., the desired phase separated morphology was not observed; at 70° C. and 120° C., a phase separated morphology was observed (described below). Since the substrate or the undercoat usually cannot tolerate a temperature much higher than 100° C. and also an increased energy is consumed at higher curing temperatures, we determine that a desired curing temperature range would be from approximately 70° C. to approximately 100° C. for all practical purposes depending upon the components and substrate.

Example 2

Production of Polyurethane Coating Formulation Containing 10% PCL

In a 4 oz wide mouth jar, 1.37 g of PCL (Aldrich, typical $M_n$ 42,500, typical $M_w$ 65,000) was combined with 1.35 g of THF and 5.05 g of butyl acetate. The polymer was allowed to dissolve with the aid of an ultrasonic bath. 9.15 g of the Desmophen R 221 75 saturated polyester (Bayer Material Science) was then added to the PCL solution and mixed with a magnetic stir bar to obtain a transparent solution. Finally, 5.0 g of Desmodur N 3390 BA/SN aliphatic polyisocyanate (Bayer Material Science) and 0.33 g of a 10% Byk-301 surfactant solution in butyl acetate were added to the solution. The solution was mechanically stirred for 2 minutes first, and then transferred to a covered plastic mixing cup for further mixing and degassing using a Thinky centrifugal mixer. The mixing and degassing schedule was mixing at 2000 rpm for 1 minute (2000 rpm) degassing at 2200 rpm for 30 seconds.

Example 3

Production of a Low VOC Polyurethane Coating Formulation Containing 15% PCL

A low VOC (volatile organic compound) (<150 g/L VOC), solvent borne coating formulation was prepared as follows. Zero VOC thinner was first prepared by combining methyl acetate and parachlorobenzotrifluoride (PCBTF) in a 1:1 ratio by mass. In a 4 oz wide mouth jar, 2.13 g of PCL was combined with 2.13 g of THF and 25.0 g of zero VOC thinner. The PCL was allowed to dissolve with the aid of an ultrasonic bath. 9.53 g of Desmophen R 221 75 was then added and mixed with a magnetic stir bar to obtain a transparent solution. Finally, 3.93 g of Desmodur N 3390A and 0.26 g of a 10% BYK-301 surfactant solution in butyl acetate were added. The solution was mechanically stirred for 5 minutes before being applied.

Example 4

Production of PU/Nanoparticle/PCL Nanocomposites Coating Formulation

To compensate for the softness of the PCL phase, experiments were conducted to incorporate nanoparticles to reinforce the PCL phase. The nanoparticles can be but not limited to the following: an organo-modified clay, metal oxide, organo-modified metal oxide, and carbon nanotubes. As an example, organically modified aluminum oxide was prepared by a 110° C. reflux reaction of alumina nanoparticles (NanoTek, Nanophase, Inc.) with an aminosilane under inert gas. The nanoparticles were dispersed in anhydrous butyl acetate by high shear mixing. Next, a nanoparticle/PCL solvent dispersion was prepared in a glass jar by first combining PCL and butyl acetate, then adding the nanoparticle dispersion and sonicating for several minutes, followed by addition of THF. The jar was closed tightly and tape-sealed, then sonicated for 2-3 hours in warm water until a homogeneous mixture resulted. Addition of polyol followed immediately after removing the jar from the ultrasonic bath, while the contents were still warm. The jar was capped and stirred for 2-3 minutes before addition of polyisocyanate. Addition of polyisocyanate, surfactant and catalyst was followed by 2 minutes of vigorous agitation on a vortexer and 1 minute of stirring on a stir plate. The mixture was then transferred to a disposable mixing cup and degassed with a centrifugal mixer for 30 seconds at 2200 RPM. Samples were prepared one at a time to ensure prompt application and maintained at a temperature of ~40° C. (until applied) as a means of viscosity control and to prevent crystallization of the PCL phase.

PCL grafted alumina nanoparticles were synthesized according to the following procedure. Alumina was obtained from Nanophase Technologies. Before the grafting reaction, the nanoscale alumina powder was dried in vacuum at 70° C. for 12 hours. 3 g of the dried alumina was dispersed in 100 mL dry toluene under a nitrogen atmosphere. Then 0.3 mL of triethylaluminum, $AlEt_3$ (25% toluene solution), was added and stirred for an additional hour at 70° C. 12 g of ε-caprolactone were be added under nitrogen, and the reaction was allowed to proceed at 70° C. for 48 hours. The polymerization was stopped by addition of diluted HCl, and the resulting PCL-grafted alumina nanoparticles were recovered after solvent and residual monomer removal by drying the mixture at 85° C. under reduced pressure for 24 hours.

Example 5

Application of Coating Formulation to a Metallic Test Panel

Cold rolled steel test panels (12"×4") were acquired from ACT Test Panels which had been primed with an electrodeposited black epoxy (Powercron 8000) which aids in gloss measurement as well as evaluation of haze and microstructure. Panels were wiped with isopropanol immediately prior to coating application. Coatings were applied on a leveled drawdown plate using a Bird-type film applicator with a 12 mil gate, resulting in a wet film thickness of approximately 6 mils. A bead of coating formulation was applied along the top edge of the test panel and a small portion of its length. The applicator, supported on either side by panels of the same thickness as the one being coated, was then drawn down across the bead in a smooth motion. The coated panel was allowed to air dry for 10 minutes on the drawdown plate, and then transferred to a leveled oven rack in a gravity convection oven (preheated to 70° C.) where it was cured overnight.

Example 6

Application of Coating Formulation to Wood Test Panel

Stained maple test panels were wiped thoroughly with kimwipes saturated with butyl acetate. The panels were then dried thoroughly in a mechanical convection oven for 15 minutes at 70° C. The coating was applied on a leveled drawdown plate using a wool or synthetic applicator pad which had been rinsed thoroughly with butyl acetate. The applicator pad was first saturated with coating formulation and then drawn down across the panel in a smooth motion. The coated panel was allowed to air dry for 10 minutes on the drawdown plate, and then transferred to a leveled oven rack in a gravity convection oven (preheated to 70° C.) where it was cured overnight. The panel was the allowed to cool followed by sanding with 200 grit sandpaper under light to medium pressure. The coating procedure was then repeated, beginning with the solvent wipe-down step, to complete the second and third coats. After application of the third coat, the panel was not sanded but instead aged for 4 hours at 100° C.

Testing and Examination of the Coating

We examined the morphology of the PU/PCL nanocomposite coating (20% PCL) using the transmission optical microscopic images (FIG. 1). The dark spherical particles are the PCL phase and polyurethane is the light phase is PCL. The size of the PCL spheres is generally less than one micron. It should be noted that this phase separated morphology is only achieved with the phase separation via reaction process at certain temperature ranges.

Figure 2:
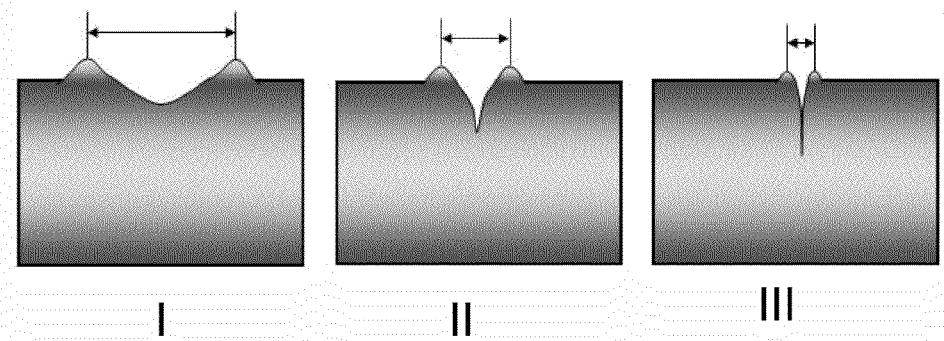
FIG. 2 illustrates three types of controlled scratches/cracks generated: Type I, II and III.

In order to quantitatively evaluate the self-healing performance of our nanocomposite coatings, we generated artificial scratches and cracks using a number of different means. A Gardco PA-2197B balanced beam mar tester with a custom-modified pointed tip was used to create a wide but shallow scratch with a width of hundreds of microns (Type I). (The mar tester allows the creation of reproducible cracks). The same mar tester with a sharpened knife edge tip was used to create narrower, but deeper scratches with a width in the tens of microns (Type II). A fresh razor blade was used to generate a deep, but narrow crack, with a width in the few microns (Type III). A schematic of the different types of scratches/cracks is shown in FIG. 2. Note that in all three types of scratches, material is displaced, and not removed from the system. Self-healing was achieved with these types of scratches. Obviously, when the material has been "gouged" out and removed permanently from the coating, self-healing cannot be expected.

Heat activated self-healing was performed by putting a scratched panel in an oven at 120° C. for 15 minutes. The panel was then taken out of the oven and allowed to cool down to room temperature before being examined under an optical microscope. Later experiments indicated that self-healing of these coatings could be achieved by a temperature treatment as low as 60° C. for as short a time period as a few seconds. For self-healing to occur, the heat treatment temperature must be above the glass transition temperature and the melting temperature (semi-crystalline polymer) of the thermoplastic. If other thermoplastic material is used as the healing material, the temperature at which self-healing occurs can be varied. For example, The use of poly(octadecyl methacrylate), a semi-crystalline thermoplastic polymer with a melting temperature of 37.5° C. and a very low glass transition temperature of −100° C., can lead to self-healing at near ambient temperatures. Generally, self-healing of damages to the material is induced by heating the material to temperatures between 40° C. and 200° C. for 5 seconds to 30 minutes, and preferably between 5 seconds to 2 minutes. We have also achieved self-healing in a bulk epoxy material at 160-190° C. [X. Luo, R. Ou, D. E. Eberly, A. Singhal, W. Viratyaporn and P. T. Mather, "A Thermoplastic/Thermoset Blend Exhibiting Thermal Mending and Reversible Adhesion", *ACS Applied Materials and Interfaces*, 1, 612-620 (2009)].

Healing of a Shallow, but Wide Scratch (Type I)

Figure 3:
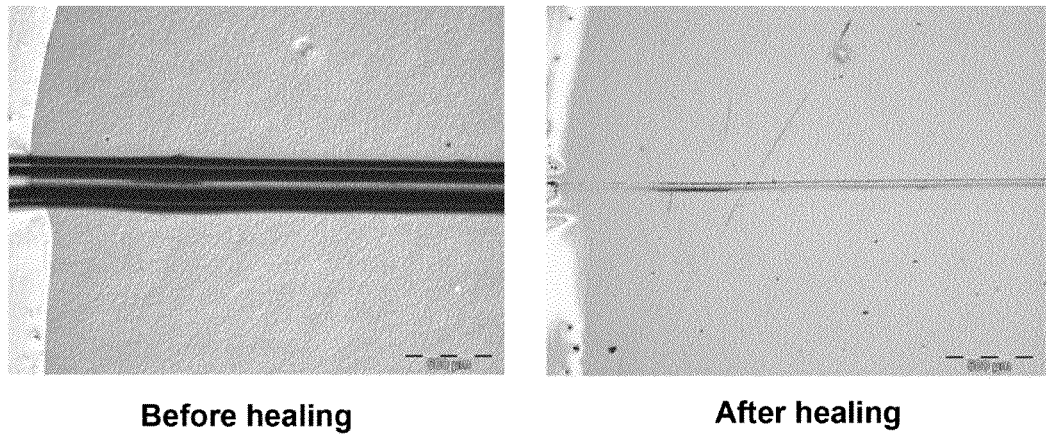
FIG. 3 illustrates healing of a shallow and wide scratch on the PU/PCL nanocomposite coating surface (scratch created using a less sharp tip on the mar tester with a 100 g load).

FIG. 3 shows the scratch created by a 100 g load on the PU/PCL nanocomposite coating, before and after healing. The scratch largely disappears except for the center where the tip cuts into the coating.

Healing of a Deep Crack (Type II)

Figure 4:
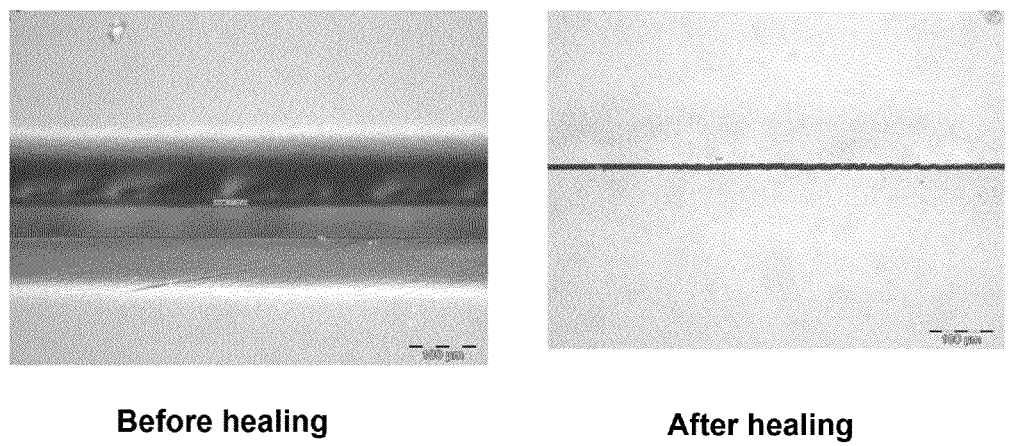
FIG. 4 illustrates the healing of a deep crack on the PU/PCL nanocomposite coating surface (crack created using a sharp tip on the mar tester with a 100 g load).
Figure 5:
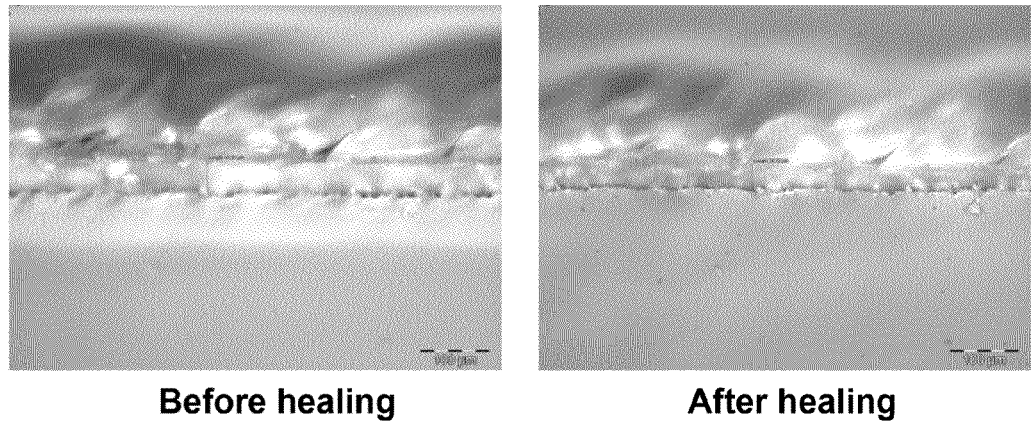
FIG. 5 illustrates healing of a deep crack on the polyurethane control coating surface (crack created using a sharp tip on the mar tester with a 100 g load).

FIG. 4 shows the deep crack on the PU/PCL composite coating before and after healing. The crack is not completely healed, but the gap is significantly closed. In comparison, as shown in FIG. 5, the same deep crack on a control polyurethane coating (with no PCL added) only changes minimally.

It is apparent that the ability of the coating to self-heal depends on the extent of damage it sustains and on the coating material. Therefore, to quantify this effect, we created deep cracks using the sharp tip with different weight loads on the mar tester. The crack gap before and after heat treatment was measured and the percentage gap recovery was calculated according to the following equation:

$$\text{Gap recovery} = \frac{(\text{original gap} - \text{gap after self healing})}{\text{original gap}} \times 100\%$$

Figure 6:
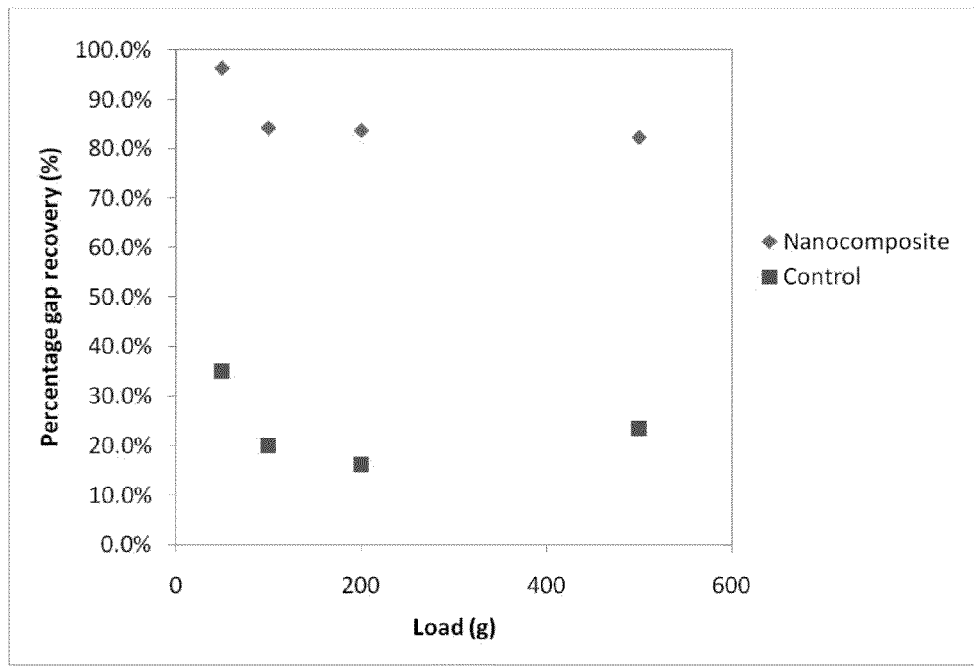
FIG. 6 illustrates percentage gap recovery vs. applied load.

FIG. 6 presents the percentage gap recovery as a function of the applied load for both the PU/PCL nanocomposite coating and the polyurethane control coating. It is clear that the gap recovery for the PU/PCL nanocomposite coating is much greater than that of the control. In addition, gap recovery decreases as the load increases. At small enough load, gap recovery for the PU/PCL nanocomposite coating approaches 100%.

Healing of a Razor Blade Crack (Type III)

Figure 7:
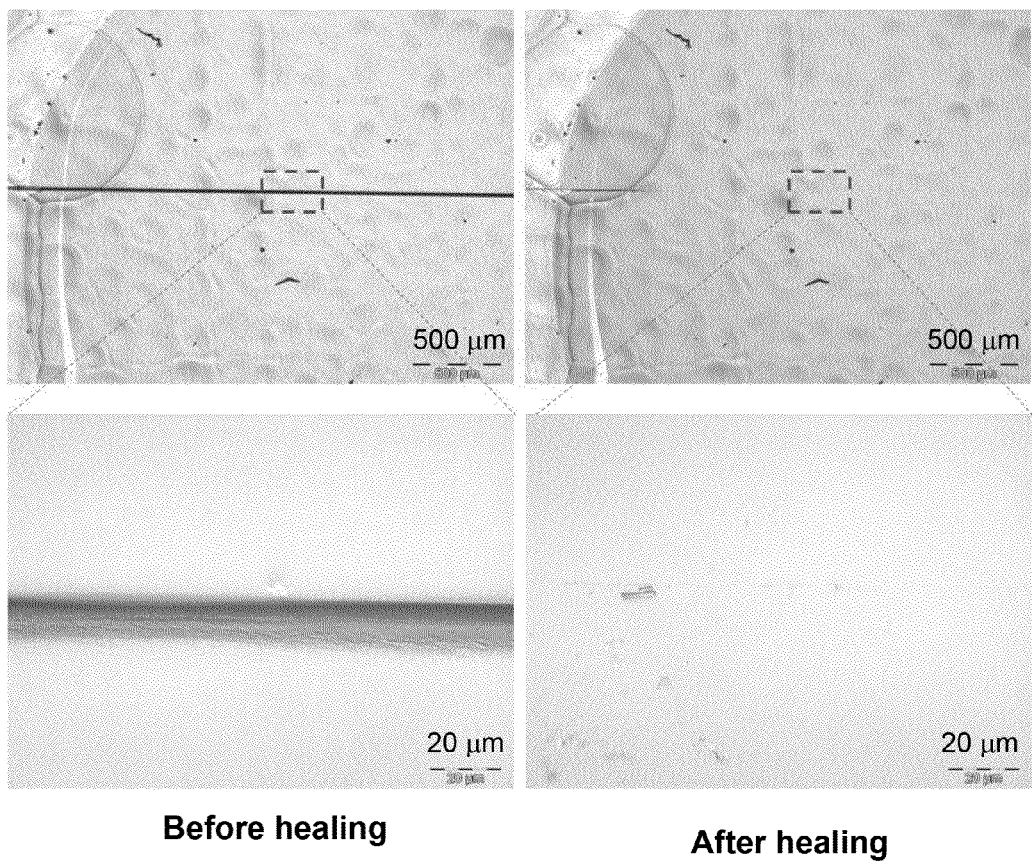
FIG. 7 illustrates self-healing of a razor blade crack on the PU/PCL coating.

The results of the self-healing behavior of the PU/PCL nanocomposite coating is shown in FIG. 7. With PU/PCL nanocomposite coating, the crack is completely healed. No gap can be observed, even at the highest magnification that can be achieved with our optical microscope (100×, bottom right).

The healed region of the PU/PCL nanocomposite that was shown in FIG. 7 was further examined with AFM. FIG. 8 shows the topography images of the sample before and after healing. With heat treatment, the crack is effectively healed. Note that although the scanned area of unhealed and healed areas are the same (20 μm square), the scale of the height color bar located beneath the images for the unhealed sample is in microns, but that of the healed samples is in hundreds of nanometers.

To gauge the crack depth and to see how well it is healed, line profile analysis was performed across the crack and the result is shown in FIG. 9. The original crack was about 5 μm wide and 6 μm deep. After healing, no crack can be detected on the line profile (bottom right) although the trace is visible in the image.

The present invention has been described with respect to the above exemplary embodiments. However, as those skilled in the art will recognize, modifications and variations in the specific details which have been described may be resorted to without departing from the spirit and scope of the invention as defined in the appended claims.

We claim:

1. A self healing polymer coating comprising:
   a) polyurethane thermoset resin;
   b) polycaprolactone (PCL) thermoplastic present as sub-micron generally spherical particles formed in situ by phase separation via reaction and dispersed in a matrix of the thermoset resin; and
   c) the thermoplastic and thermoset forming a transparent structure wherein the thermoset is a load-bearing phase performing major mechanical and structural functions and wherein the thermoplastic serves as a self-healing phase to repair cracks and other damages in the material to restore its mechanical and structural integrity after damage, wherein the polyurethane comprises 80-90 wt. % and the PCL is 10 to 20 wt. %.

2. The self healing polymer coating as claimed in claim 1 wherein the polyurethane thermoset and PCL thermoplastic form an immiscible blend.

3. The self healing polymer coating as claimed in claim 1 further including a nanoparticle additive for the reinforcing the mechanical properties of the coating.

4. The self healing polymer coating as claimed in claim 3 wherein the nanoparticle additive is at least one of: an organo-modified clay, metal oxide, organo-modified metal oxide, and carbon nanotubes.

5. The self-healing polymer coating as claimed in claim 1 wherein the self-healing of the damages to the material is induced by heating the material to temperatures between 40° C. and 200° C. for 5 seconds to 30 minutes.

6. The self-healing polymer coating as claimed in claim 3 wherein the nanoparticle additive comprises PCL grafted alumina.

7. A self healing polymer coating comprising:
   a) a thermoset resin;
   b) a thermoplastic present as sub-micron generally spherical particles formed in situ by phase separation via reaction and dispersed in a matrix of the thermoset resin;
   c) a nanoparticle additive of PCL grafted alumina for reinforcing the mechanical properties of the coating; and
   d) the thermoplastic and thermoset forming a transparent structure wherein the thermoset is a load-bearing phase performing major mechanical and structural functions and wherein the thermoplastic serves as a self-healing phase to repair cracks and other damages in the material to restore its mechanical and structural integrity after damage, wherein the thermoset comprises 80-90 wt. % and the thermoplastic is 10 to 20 wt. %.

8. The self-healing polymer coating as claimed in claim 7 wherein the thermoset material is selected from the group of: polyurethane, epoxy, bis-maleimide, phenol-formaldehyde, urea-formaldehyde, melamine-formaldehyde, polyimide, alkyd, unsaturated polyester, silicone, fluoropolymers, and polyvinyl formal and blends thereof.

9. The self-healing polymer coating as claimed in claim 7 wherein the thermoplastic material is selected from the group of: polyester, polycaprolactone (PCL), poly(acrylic acid), poly(acrylonitrile), poly(ether ketone), polystyrene, thermoplastic polyurethane, poly(vinyl acetate) and blends thereof.

10. The self-healing polymer coating as claimed in claim 7 wherein the self-healing of damage to the material is induced by heating the material to temperatures between 40° C. and 200° C. for 5 seconds to 30 minutes.

11. The self-healing polymer coating as claimed in claim 7 wherein the thermoset resin is polyurethane and the thermoplastic is polycaprolactone (PCL).

12. The self polymer coating as claimed in claim 7 wherein the thermoplastic molecular weight (number average) is between 10,000 to 90,000.

* * * * *